United States Patent [19]
Niskin

[11] 3,869,913
[45] Mar. 11, 1975

[54] METHOD AND APPARATUS FOR DETERMINING SURFACE WIND VELOCITY

[76] Inventor: Shale J. Niskin, 2941 Lucaya St., Miami, Fla. 33133

[22] Filed: Sept. 17, 1973

[21] Appl. No.: 397,822

Related U.S. Application Data

[63] Continuation-in-part of Ser. No. 258,543, June 1, 1972, abandoned.

[52] U.S. Cl. .................................................. 73/189
[51] Int. Cl. .......................................... G01p 13/00
[58] Field of Search .................. 73/170 R, 188, 189

[56] References Cited
UNITED STATES PATENTS
2,045,521  6/1936  Hertelendy ......................... 73/188
2,320,359  6/1943  Gatty .................................... 73/188

*Primary Examiner*—Jerry W. Myracle
*Attorney, Agent, or Firm*—Salvatore G. Militana

[57]  ABSTRACT

A method and apparatus for determining surface wind velocity in a certain area consisting of dropping two independent markers of different and known fall rates or connected markers of predetermined fall rates simultaneously from a predesignated height above the ground and observing the distance between the two markers at touchdown which distance is known as drift. It has been ascertained by empirical experience and proven by mathematical computation that such wind drift is directly related to wind velocity so that by use of appropriate tables or by visual observation of the amount of drift, the wind velocity is immediately determined.

5 Claims, 4 Drawing Figures

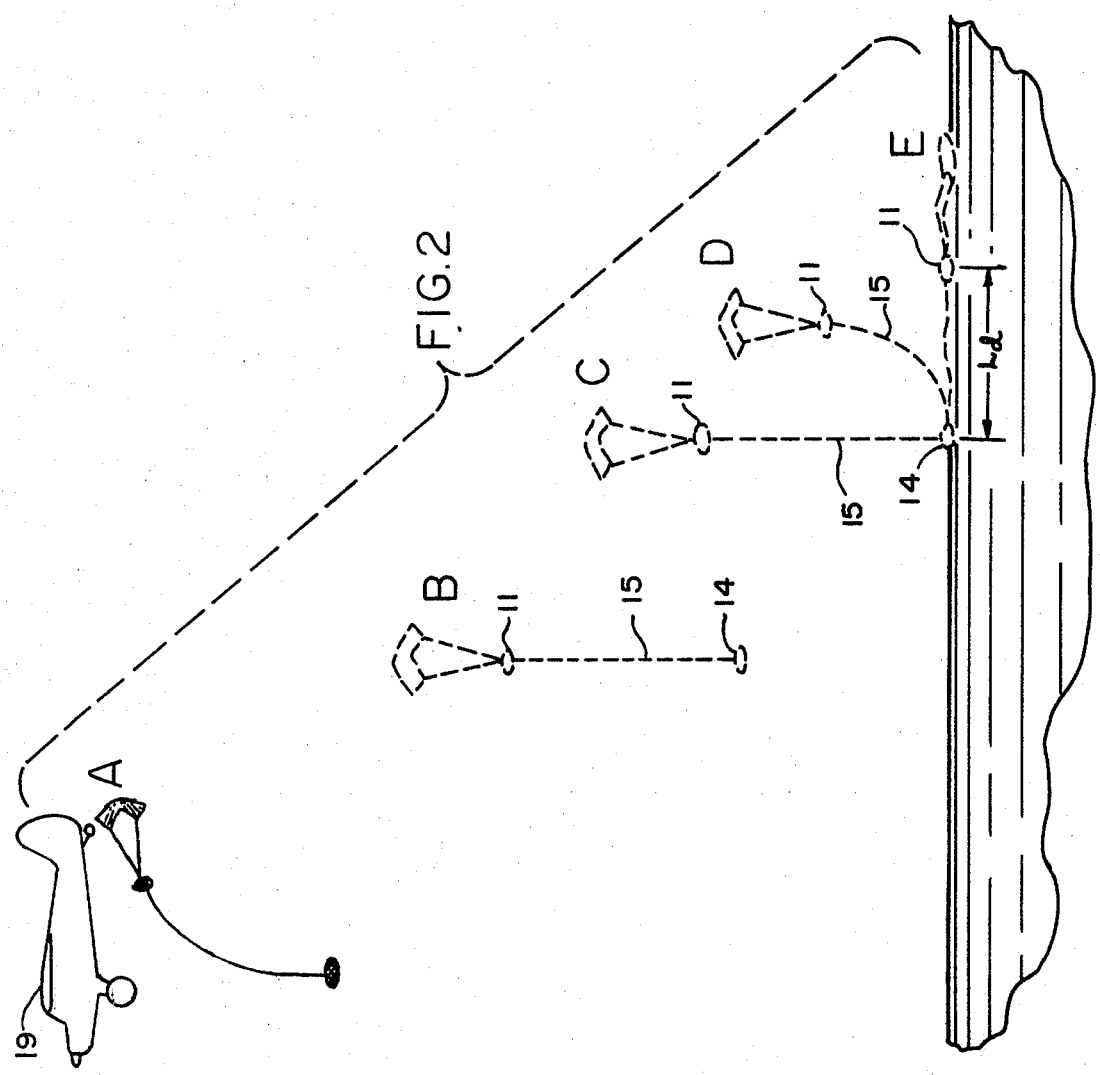
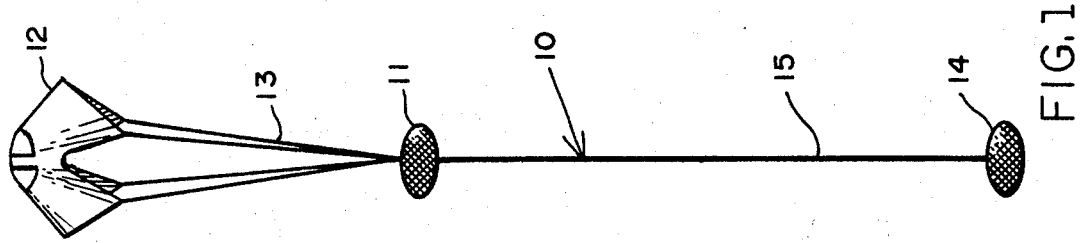

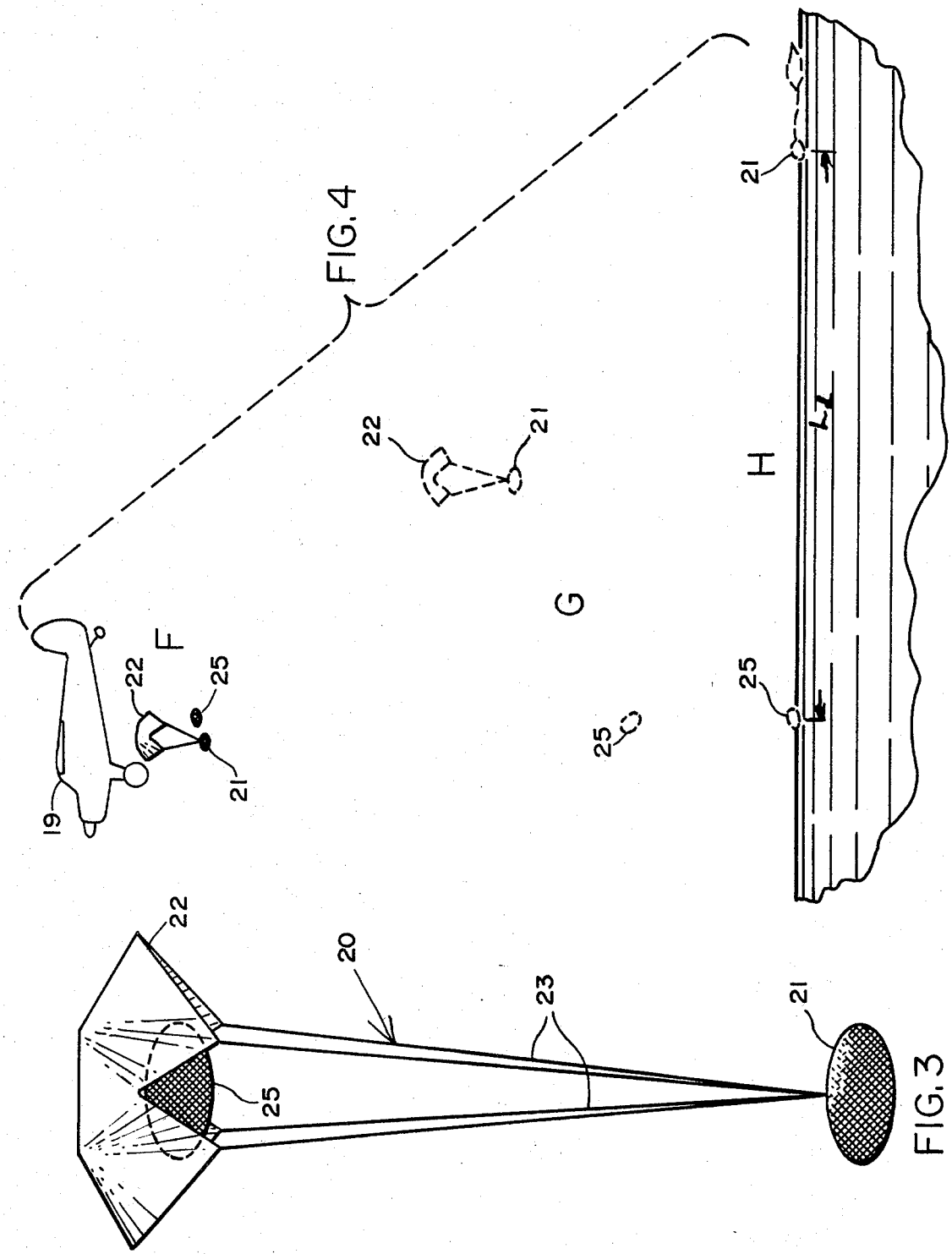

METHOD AND APPARATUS FOR DETERMINING SURFACE WIND VELOCITY

CROSS REFERENCE TO A RELATED APPLICATION

This application is a continuation-in-part of my copending application Ser. No. 258,543, now abandoned, filed June 1, 1972, for Method For Computing Surface Wind Velocity.

BACKGROUND OF THE INVENTION

1. Field Of The Invention

This invention relates to a method and apparatus for determining wind velocity and is particularly directed to determining the surface wind velocity above a certain area by use of expendable dye packets or other similar markers dropped from aircraft.

2. Description Of the Prior Art

There are many ways for determining wind velocity but at the present time there are no expendable devices that may be deployed from an aircraft for the purpose of determining with reasonable accuracy the velocity of wind in a certain area. One of the present ways of determining the velocity of wind is by the use of radar and the like. Another way is by the dead reckoning methods for computing wind velocity. However, considerable skill and knowledge of the person making the observation and computation are required. Of course, anemometers and weather balloons utilized by ground personnel may be used to determine wind velocity and the information radioed to the aircraft desiring this information. The most convenient, but less accurate manner of determining wind velocity is by the physical observation of ocean surf, wave surfaces and wind borne articles such as smoke, etc. There is some relationship between the height of the waves and the speed at which smoke is carried downwind and the velocity of the wind causing the observed waves and smoke motion, however, inaccurate the conclusion as to the wind velocity may be.

Since there is a definite relationship between a falling article and the drift effected on that article by the wind during its fall, the present invention contemplates the use of expendable markers in the determination of wind velocity in a predesignated area.

SUMMARY OF THE INVENTION

The present invention contemplates providing a method and apparatus for determining the velocity of wind over a certain ground area by deploying from an aircraft flying at a known height, an expendable and inexpensive device consisting of two markers having different rates of fall and then measuring the horizontal distance between the two markers at touchdown on the ground area.

Another object of the present invention is to provide a method and apparatus for determining the velocity of wind existing between ground level and a short distance thereabove by dropping an expendable and inexpensive pair of markers that are tied together by a line equal in length to the designated aforementioned height above the ground and observing the distance between the two markers at touchdown on the area.

A further object of the present invention is to provide a method for determining the velocity of wind at a great height above a certain area by dropping a pair of markers simultaneously, the markers having different and known drop rates and one of which is secured to a drogue or parachute and observing the distance between the two markers at touchdown on the area.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the drawings:

FIG. 1 is an elevational view of an expendable device for carrying out my method of determining the velocity of air directly over a certain area.

FIG. 2 is a diagrammatic view illustrating my method of deploying the device from an aircraft showing the successive positions in the descent of the device.

FIG. 3 is an elevational view of an alternate construction of the expendable device.

FIG. 4 is a view similar to FIG. 2 showing the successive positions of the descent of the alternate device.

DESCRIPTION OF THE PREFERRED EMBODIMENTS

Referring to the drawings wherein like numerals are used to designate similar parts throughout the several views, the numeral 10 refers to my device consisting of a marker 11 secured to a parachute or drogue 12 by shrouds 13. A second marker 14 is secured to the marker 11 by a line 15 of designated length. The length of the line 15 is determined by the height above the area at which the desired velocity of the wind is to be determined. In other words, if it is desired to determine the wind velocity directly over a certain area at a height of fifty feet, then the line 15 connecting the two markers 11 and 14 should be fifty feet long.

In the normal use of my wind velocity indicating device 10 an aircraft 19 flying at a predetermined height above the area in question, the device 10 is deployed from the aircraft 19 as illustrated by position —A— of FIG. 2 and permitted to fall freely as shown by positions —B— and —C—. During this period of fall, the device 10 is falling at rate influenced by the combined weights of markers 11 and 14. When the device 10 has arrived at position —C—, the lower marker 14 will have touched down so that the device 10 now falls freely of the marker 14 under the influence only of the marker 11 and the drogue 12 to which it is attached. After the marker 11 has touched down or settled on the ground or water as illustrated by position —E—, the distance —hd— between the markers is observed for determining its measurement. Upon ascertaining the distance between the markers 14 and 11 at touchdown either by actual measurement or by observing same as explained herinafter, the velocity of the wind is readily determined in a number of different ways.

As indicated hereinabove, it is common knowledge that there is a definite relationship between the drift of a free falling body and the velocity of the wind effecting that drift. The velocity of the wind varies with the distance the body falls and the rate of fall of the body. Prior to the use of my device 10, the length of the line 15, the weight of the marker 11 and the size and other characteristics of the drogue 12 are standardized so that all of the devices 10 so used are identical; and when dropped, the drift resulting from the particular wind force will be readily ascertained. It is obvious that upon dropping these identical devices 10 at a distance greater than the length of the line 15, the drift or the distance of —hd— will vary directly with the velocity of the wind. By dropping these identical devices 10 over an area where the velocity of the wind has been previously and accurately determined by the use of anemometers, for example, by ground personnel, this relationship between drift and velocity of wind is readily established. It has been found by empirical experience of a number of droppings of these identical devices 10 wherein the line 15 is 68 feet long and the fall rate of the combined drogue 12 and marker 11 is 34 feet per second, then the drift or the distance —dh— will be 1.66 feet for each knot of wind velocity. Therefore, it is a simple matter for a person wishing to know what the velocity of the wind is in a certain area, he merely drops my device 10 above that area and then upon touchdown of the two markers 14 and 11, he measures the distance between them. If, for example, the distance between the two markers 14 and 11 is 16.66 feet, the average velocity of the wind between ground level and 68 feet thereabove is 10 knots.

In those instances where it is desired to obtain the average wind velocity at the height the aircraft 19 is flying above the area, then my alternate device 20 is deployed from the aircraft as shown by FIGS. 3 and 4. The device 20 consists of a marker 21 attached to a parachute or drogue 22 by shrouds 23. Within the folds of the parachute 22 is a further marker 25 which is loosely positioned therein and adapted to fall freely of the parachute 22 when the device 20 is deployed from the aircraft 19. In order to determine the average velocity of the wind above a certain area occuring between a certain height above the earth and the ground itself, the plane 19 will fly at that predetermined altitude above the ground where my device 20 is deployed. The drogue 22 will open immediately releasing the marker 25 which will then fall freely while the combined drogue 22 and marker 21 will fall at a slower rate then that of the marker 25 and drift in a direction away from the marker 25 as determined by the direction and velocity of the wind. When the combined parachute 22 and marker 21 has touched down, the distance between the two markers 25 and 21 is noted and the velocity as well as the direction of the wind are ascertained thereby.

As indicated hereinabove in connection with my device 10, the drift effected by wind is directly proportional to the velocity of the wind, which velocity is determined empirically. Again, as in the use of my device 10, the various parts of my device 20 are standardized so that the difference in the rate of fall of the freely falling marker 25 and that of the combined drogue 22 and marker 21 is predetermined and in fact common in all of the devices 20.

Upon experimentally dropping these identical devices 20 from a predesignated height above the earth, ascertaining the velocity of the wind by the use of anemometers, upon measuring the distance between the markers 21 and 25, the relationship between the drift and the velocity of the wind can be ascertained with accuracy. For example, if it is desired to determine the average velocity of the wind existing between ground level and 680 feet above the ground, a pilot will then fly at an altitude of 680 feet. The device 20 dropped from this altitude is one in which the difference in rate of fall between the freely falling marker 25 and the combined drogue 22 and marker 21 selected for the sake of convenience only is 34 feet per second. In this instance, the drift effected by a velocity of wind per knot has been determined to be 16.66 feet. Now, if the distance between the markers 21 and 25 is 166.6, then the velocity of the wind is readily noted as being 10 knots.

It is indeed awkward for the user of my device 10 or 20 to have to actually measure the distance between the markers at touchdown by use of a ruler and the like along the earth, since he is normally in an aircraft finding an immediate need for the information while flying above the area in question. Therefore, a sort of a range finder is required that will reveal to him very quickly the distance between the markers with reasonable accuracy. Such an instrument can well be nothing more than a binocular having a transparent grid in the eyepiece whose markings indicate distance accurately when viewing from above the area at a predetermined altitude. If desired, a polaroid film having a like grid imprinted on the film, which will indicate upon taking a picture of the markers from the predetermined altitude the two markers and the number of grid lines therebetween to permit the user to determine the distance between the markers on the actual wind velocity of one of the markers is positioned on the zero knot indication on the grid.

It is to be noted that the average velocity of the wind as determined by my devices 10 and 20 is a composite or integrated total of the horizontal transport of the mass of air both in velocity and in direction. For example, if my device 20 is dropped from an aircraft at the height of one mile above the earth and the actual movement of the upper half of the air mass has a velocity of 15 knots in a northerly direction while the lower half of the air mass has a velocity of 5 knots in a southerly direction, my device will indicate a wind velocity of 10 knots in a northerly direction. The direction of the wind is determined by the position of the marker 21 and parachute 22 with relation to that of the marker 25. On the other hand, any of the present devices used to determine wind direction would only indicate the direction of the wind by the mass of wind then acting on the device. As in the use of an anemometer and a smoke bomb on the ground, the smoke emanating from the bomb in my last illustration would indicate a wind blowing in a southerly direction and the anemometer would indicate a velocity of 5 knots.

In the above discussion of my devices 10 and 20 taken in connection with the drawings, it is shown that there is a definite relationship determined by empirical experience between the velocity of wind and the drift effected thereby. This relationship can be proven correct by use of certain mathematical formulae which is set forth in detail in my pending patent application but forming no part of the present application. It appears that either by use of the mathematical formulae or by empirical experience, tables can be made up for varying distances between markers. Then all a person need do is drop the device 10 or 20 when he determines the horizontal distance between the markers at touchdown, he need only go to the appropriate table for the device 10 or 20 whichever he used and select the wind velocity that is indicated for the distance measured between the two markers. This reduces to a minimum the possibility of error and the amount of work involved.

It is to be noted that the markers 11, 14, 21, and 25 may be in the form of a dye packet that releases a dye when it strikes the water on the earth, smoke markers that give off smoke when they touch down, or any other device which will clearly mark its position on touch down. The present invention thereby makes available an expendable device that permits a person to determined the wind velocity above a certain area by merely deploying the device containing two markers from an aircraft and observing the horizontal distance between the markers at touchdown. This manner of determining wind velocity is inexpensive, accurate with the results obtained very quickly. Also, the wind velocity may now be obtained where there are no navigational aids available or where there are no ground facilities available for determining wind velocity. With the present device a person flying an aircraft can obtain the wind velocity very readily at any time he so desires it whether over land or water or whether he is over remote and uninhabited areas.

What I claim as new and desire to secure by Letters Patent of the United States is:

1. The method of determining the horizontal wind velocity above an area comprising the steps of dropping two markers of predetermined and different fall rates substantially simultaneously from above said area, said markers commencing to fall at different rates at a predetermined height above said area, noting the horizontal distance between said markers at touchdown, said distance being directly related to the horizontal velocity of the wind whereby the velocity of the wind is readily ascertained.

2. The method as recited by claim 1 wherein said markers fall freely of each other and thereby fall at different rates from the height at which said markers are dropped.

3. The method as recited by claim 1 wherein said markers fall at a same rate from the height at which said markers are dropped until a predetermined height above the area has been reached when the first of said markers has touched down and the second of said markers falls freely.

4. A device for determining the horizontal velocity of the wind above an area comprising a drogue, a first marker, first means operatively connecting said marker to said drogue and a second marker having a substantially greater fall rate than that of said combined drogue and first named marker, second means operatively connecting said second marker to said combined first marker and drogue whereby upon the deployment of said drogue and said markers said markers will touch down on said area separated by a distance that is directly related to the velocity of the wind whereby the velocity of said wind is ascertained.

5. The structure as recited by claim 1 wherein both of said connecting means comprise a pliable member connecting said second marker to said first marker of predetermined length and a second pliable member connecting said first marker to said drogue whereby upon the touchdown of said second marker, said combined drogue and first marker will fall freely of said second marker.

* * * * *